(12) United States Patent
Kump et al.

(10) Patent No.: US 7,101,640 B1
(45) Date of Patent: Sep. 5, 2006

(54) SCREW-IN VENT PLUG FOR LEAD-ACID BATTERIES

(75) Inventors: William H. Kump, Cohasset, MN (US); Steven R. Peterson, Minneapolis, MN (US)

(73) Assignee: Exide Technologies, Alpharetta, GA (US)

( * ) Notice: Subject to any disclaimer, the term of this patent is extended or adjusted under 35 U.S.C. 154(b) by 1324 days.

(21) Appl. No.: 09/705,566

(22) Filed: Nov. 3, 2000

(51) Int. Cl.
*H01M 2/12* (2006.01)

(52) U.S. Cl. .............. 429/89; 429/82; 429/53; 429/54; 429/55; 429/72; 429/163; 429/175; 429/185; 429/225; 29/623.1; 29/623.2

(58) Field of Classification Search .......... 429/89, 429/82, 53–55, 72, 163, 175, 185, 225; 29/623.1, 29/623.2
See application file for complete search history.

(56) References Cited

U.S. PATENT DOCUMENTS

| 1,010,695 A | | 12/1911 | Sloan | |
| 1,280,982 A | | 10/1918 | Ford | |
| 1,289,146 A | | 12/1918 | Ford | |
| 2,571,893 A | | 10/1951 | Kendall | 136/178 |
| 4,328,290 A | | 5/1982 | Szymborski et al. | 429/54 |
| 5,108,853 A | | 4/1992 | Feres | 429/86 |
| 5,356,734 A | | 10/1994 | Oureski | 429/88 |
| 5,407,760 A | | 4/1995 | Kasner et al. | 429/54 |
| 5,422,199 A | * | 6/1995 | Adams et al. | 429/88 |
| 6,143,438 A | * | 11/2000 | Geibl et al. | 429/72 |
| 6,146,784 A | * | 11/2000 | Hakarine | 429/82 |

* cited by examiner

*Primary Examiner*—Patrick Ryan
*Assistant Examiner*—Angela J Martin
(74) *Attorney, Agent, or Firm*—Morrison & Foerster LLP

(57) ABSTRACT

A venting plug for a wet, lead-acid storage battery, a battery containing the same, a method of molding the venting plug body, and a mold for molding the venting plug body are disclosed. The sealing surfaces of the venting plug do not include a mold parting line along which acid from inside of the battery could seep between the seal and sealing surfaces. The venting plug body, however, includes a coupling structure that includes a mold parting line. The sealing surfaces of the venting plug body are molded by a single plate such that no mold parting line results along the sealing surfaces, while the coupling structure is molded by plurality of mold components such that a mold parting line results in the vicinity of the coupling structure.

19 Claims, 9 Drawing Sheets

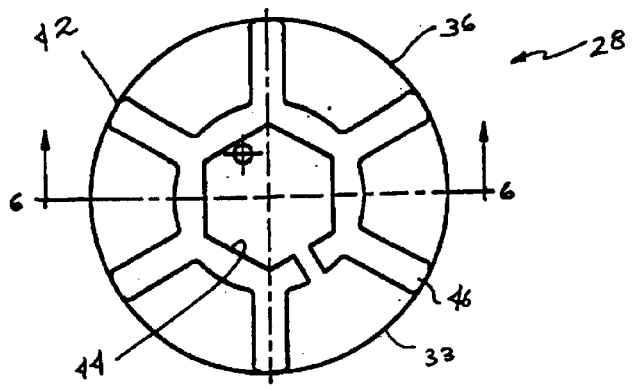
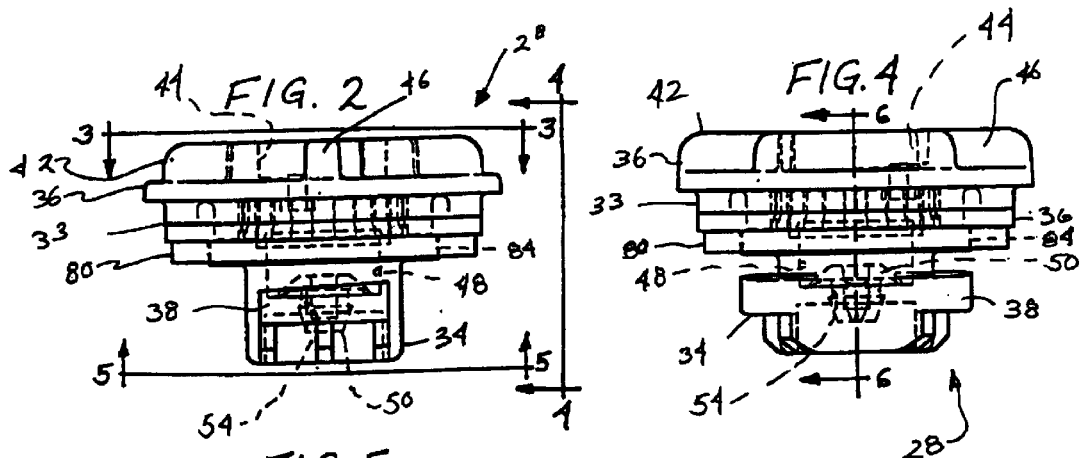
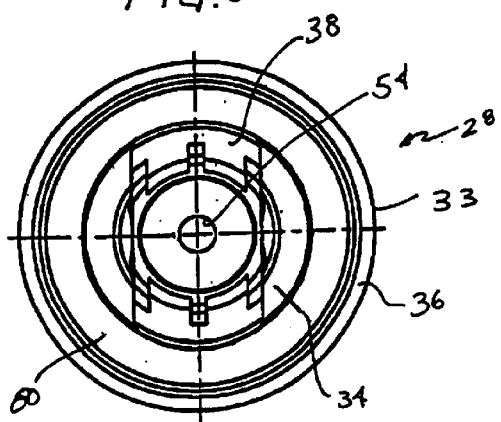

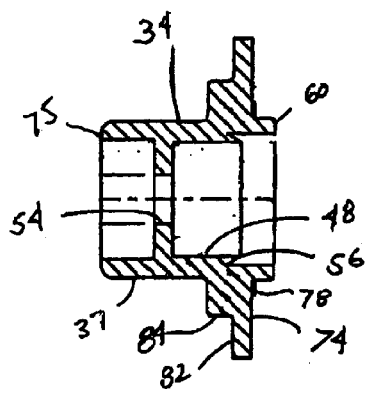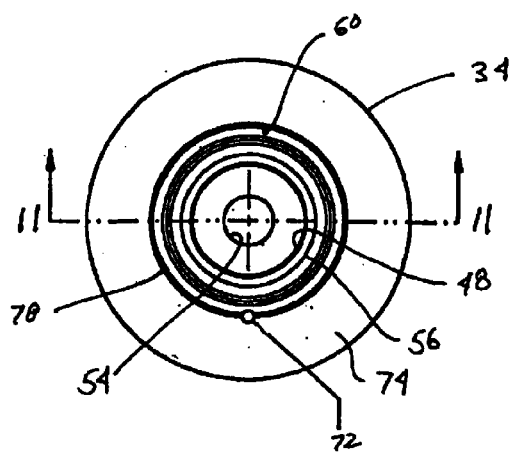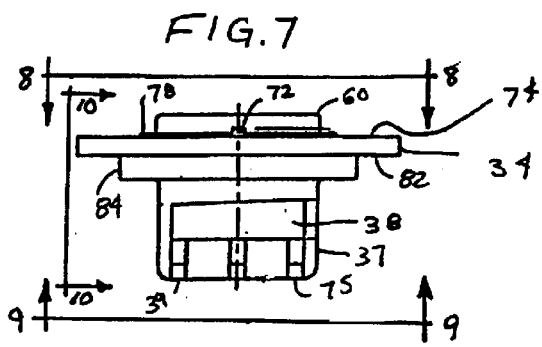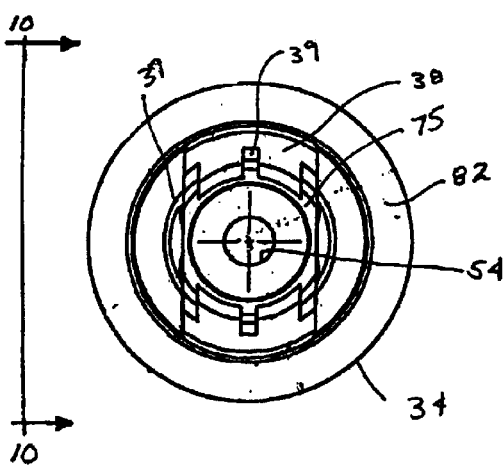
FIG. 11   FIG. 8   FIG. 7   FIG. 10   FIG. 9

SCREW-IN VENT PLUG FOR LEAD-ACID BATTERIES

TECHNICAL FIELD OF THE INVENTION

This invention relates generally to absorbed electrolyte batteries and, more particularly, to a screw-in vent plug for use in such batteries.

BACKGROUND OF THE INVENTION

Typically, wet, multicell, lead-acid SLI storage batteries include an open-topped, rectangular-shaped container sealed by a cover assembly, both of which are formed from an injection molded thermoplastic polymer, such as polypropylene. The container and cover have partition walls dividing the space within the battery into a plurality of substantially isolated cell cavities. Each cell cavity contains an electrode stack immersed in electrolyte. The cover typically defines a plurality of generally cylindrically shaped process holes, one associated with each cell cavity, through which the cell cavities are initially filled with electrolyte. In maintenance batteries, the process holes are closed-off by plugs which can be removed so that electrolyte can be periodically added through the process holes as maintenance is required.

Especially during charging, lead-acid storage batteries generate various gases in the cell cavities during operation, including hydrogen and oxygen. Hydrogen/oxygen mixtures can be volatile, creating an obvious potential for explosion. In recombinant lead-acid batteries, hydrogen and oxygen gas is retained in large part in the battery and induced to recombine into water. In wet lead-acid storage batteries, however, such gases are allowed to escape from the cell cavity and ultimately pass out of the battery through a venting system.

Wet, lead-acid storage batteries are used in a tremendous variety of vehicles and applications. As a result, such batteries are often subject to extreme and harsh operating environments. For example, batteries used in land moving vehicles, such as bulldozers, are frequently tilted at severe angles, as well as being subjected to intense operating vibrations. Thus, electrolyte can splash about the interior of a battery during normal battery use, as well as during installation and shipment.

There are a wide variety of known venting systems for expelling the volatile gases generated within a wet battery to the external, ambient space. The electrochemical performance of the battery may suffer, however, if electrolyte leaks from the battery. Accordingly, in general, venting systems in wet lead-acid batteries are directed to achieving a dual purpose: allowing gases to vent from within the battery, while retaining the electrolyte fluid therein.

Venting systems typically utilize venting plugs adapted for insertion within each process hole. A baffle positioned within the venting plug allows the passage of gases from the cell cavity while retarding the passage of electrolyte. Vent plugs are typically molded from a relatively rigid polymer, such as polypropylene, in molds that generally include vertical parting lines. As a result, the vent plugs often exhibit imperfect surfaces along the mold parting lines. These seams or excess flashing along the vertical surfaces of a vent plug can result in channels through which acid can leak due to both capillary action and the pressure developed during battery usage.

Positioned between the venting plug and the process hole is a seal or gasket, which is designed to provide a seal that prevents passage of gases and liquid between the plug and process hole. Vent plugs frequently utilize a separate seal or gasket, which is placed over the end of the plug body. Such gaskets are typically formed from die cutting molded sheet stock or by cutting molded tubes of rubber. Unfortunately, however, the vertical seam lines and flashing that can result from the vent plug molding process can prevent or inhibit the proper desired sealing operation of such separate gaskets. This is particularly true where the gasket is made of a relatively hard rubber.

U.S. Pat. No. 5,422,199 to Adams et al. discloses an integrally molded annular bead, which serves as the seal between the plug and the process hole, a single material being used for both the plug body and the bead. Unfortunately, this design can exhibit poor sealing characteristics and be prone to leakage along the seam or flashing line inasmuch as polypropylene is relatively non-resilient.

Despite the continuing effort in this area there remains a need for vent plugs that efficiently retain electrolyte within the cell cavity while effectively venting gases in a relatively safe manner, and which can be easily and economically manufactured.

Accordingly, it is a primary object of the present invention to provide a vent plug that is easily and economically manufactured. It is a related object to provide a vent plug that minimizes fabrication and assembly costs, while providing a consistent, reliable venting device.

A more specific object of the invention is to provide a vent plug that provides or facilitates an effective seal between the vent body and container cover.

It also is an object to provide a battery that vents gases generated with the cell cavities in a safe and efficient manner.

Another object of the present invention is to provide a battery having a venting system that minimizes the escape of electrolyte.

Yet another object is to provide a battery wherein all of the above advantages are realized.

These and other advantages of the present invention, as well as additional inventive features, will be apparent from the description of the invention provided herein.

BRIEF SUMMARY OF THE INVENTION

The invention provides a venting plug for use with a wet, lead-acid electric storage battery. The venting plug comprises a housing having a cylindrical plastic body and a top. The body has a central axis, at least one sealing surface, and a coupling portion for coupling the venting plug to a process hole in the battery container such that a seal is disposed between the sealing surface and the process hole. The coupling portion is typically in the form of one or more flanges, such as threads, that extend from an outer surface of the body at an angle to the axis. Significantly, at least one complete sealing surface does not include a mold parting line, while the coupling portion may comprise a mold parting line. The sealing surface that does not include a parting line may be a single annular surface or a combination of surfaces, so long as a parting line does not extend along the outer surface of the body adjacent the seal to form a path along which acid could seep between the plug body and the seal from inside the battery.

The invention further comprises a battery including such a venting plug, a method of molding the plug body, and a mold for molding the plug body. For molding the plug body, the mold comprises a single plate for molding the sealing surface, and one or more moveable components for molding the coupling structure. In the preferred embodiment, the lower half includes the single plate, two components for molding the coupling structure, and a moveable pin for molding a lower inner chamber of the body and ejecting the part. The coupling structure components are moveable outward from the molded body at an angle to the body axis to allow the body to be ejected by the moveable pin. After the valve body is molded, the upper and lower mold halves separate, the coupling structure components moving outward in a sideways direction, away from molded body. The ejector pin is then advanced upwards to eject the molded body through the central opening in the single plate to eject the molded body from the lower half of the mold.

These and other features and advantages of the invention will be more readily apparent upon reading the following description of a preferred exemplified embodiment of the invention and upon reference to the accompanying drawings.

BRIEF DESCRIPTION OF THE DRAWINGS

FIG. 2 is a side elevational view of a vent plug constructed in accordance with teachings of the invention, exploded.

FIG. 3 is a plan view of the vent plug as view from line 3—3 in FIG. 2.

FIG. 4 is a side elevational view of the vent plug as viewed from line 4—4 in FIG. 2.

FIG. 5 is a bottom view of the vent plug as viewed from line 5—5 in FIG. 2.

FIG. 7 is a side elevational view of the vent plug housing, illustrated in FIG. 2.

FIG. 8 is a plan view of the vent plug housing as viewed from line 8—8 in FIG. 7.

FIG. 9 is a bottom view of the vent plug housing as viewed from line 9—9 in FIG. 7.

FIG. 10 is a side elevational view of the vent plug housing as viewed from line 10—10 in FIGS. 7 and 9.

FIG. 11 is a cross-sectional elevational view of the vent plug housing taken along lines 11—11 in FIGS. 8 and 10.

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

DETAILED DESCRIPTION OF THE INVENTION

Figure 1:
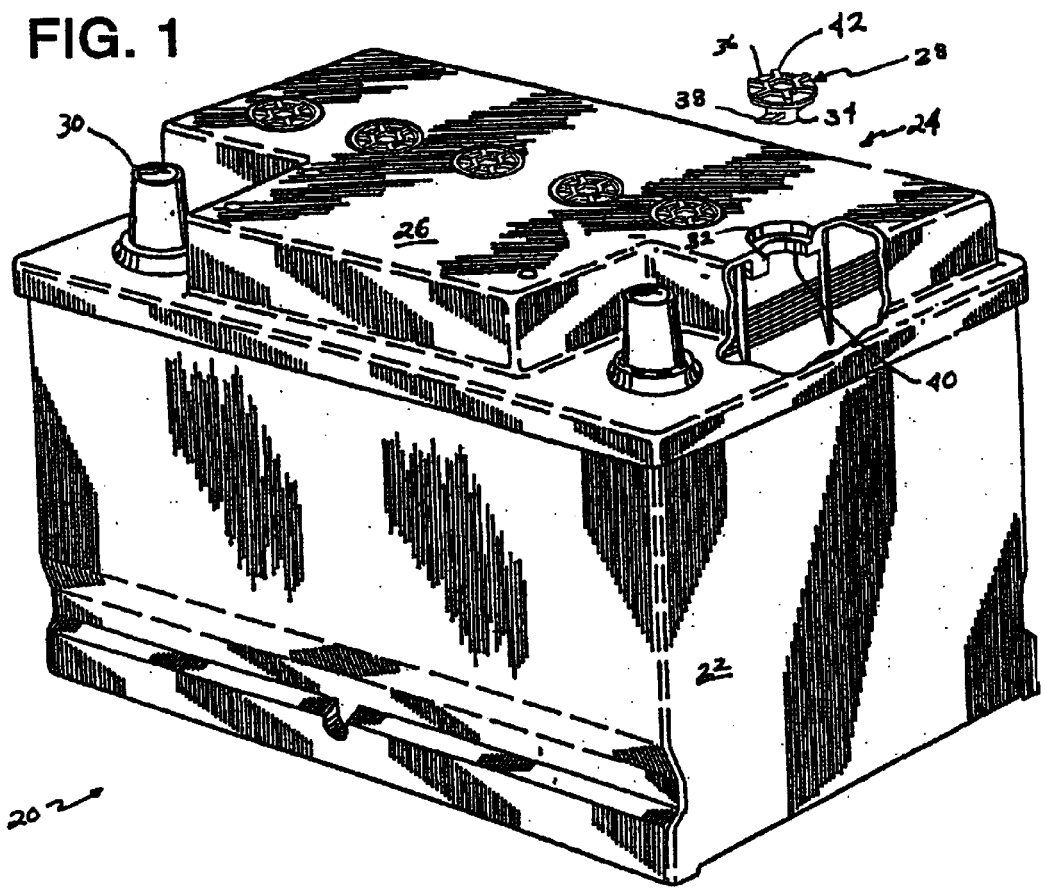
FIG. 1 is an exploded, partially broken away, perspective view of a lead-acid storage battery of the prior art.
Figure 6:
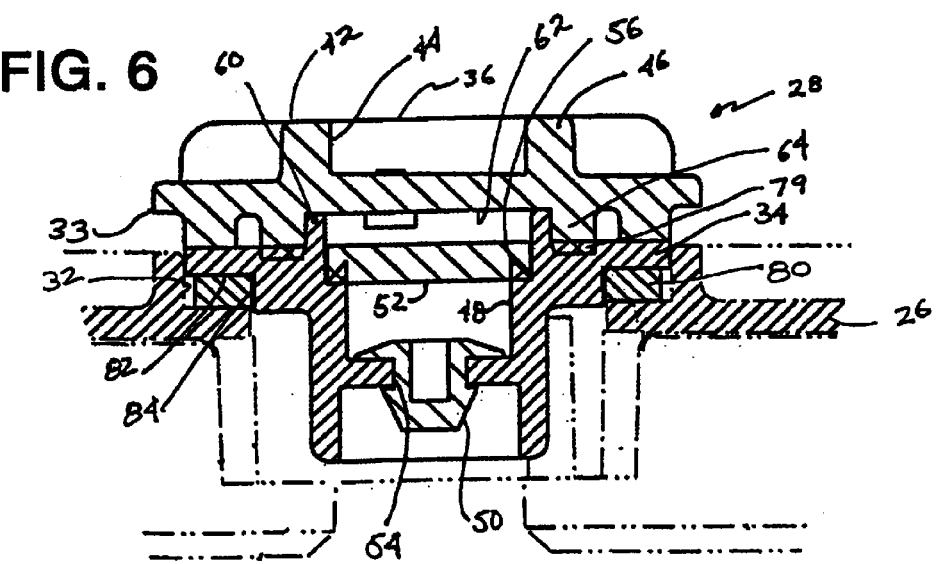
FIG. 6 is a cross-sectional view of the vent plug taken along lines 6—6 in FIGS. 3 and 4 and fragmentary view of a battery cover.
Figure 12:
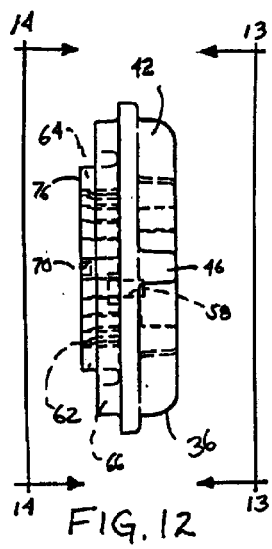
FIG. 12 is a side elevational view of the vent plug housing cover, illustrated in FIG. 2.

Turning now to the drawings, FIG. 1 shows a wet, multicell lead-acid SLI battery 20 constructed in accordance with the prior art. The battery 20 is constructed of a rectangular open container 22, to which is sealed a cover assembly 24. Two terminal posts 30 are also mounted in and extending through the cover 26. The terminal posts may alternately or additionally extend through a sidewall of the battery container.

Although the invention is equally applicable to single cell batteries, a battery in which the invention is utilized may include a plurality of cells. While not visible in FIG. 1, the interior of illustrated battery 20 is divided into a plurality of separate cell cavities, in this embodiment, six. Those cell cavities, also referred to as cells, house a plurality of series-connected electrode stacks.

A process hole 32 is provided in and defined by the cover 26 for each individual cell thereunder. The process holes 32 have a generally cylindrical shape and allow access to the individual cells, so that each cell can be filled with liquid electrolyte, usually a dilute sulfuric acid, during manufacture of the battery.

In order to allow for the escape of gases generated during the charging cycle of lead-acid batteries, the cover comprises a venting system which includes one or more venting or vent plugs 28 for venting gases from within the battery 20, while hindering the escape of electrolyte. The plurality of venting plugs 28 are adapted for insertion into the process holes 32 so as to substantially close the process holes 32. The venting plugs 28 can be removed, however, so that water may be periodically added to maintain the proper level of electrolyte within the cells.

While the venting plug 28 may be a unitarily formed structure, the illustrated embodiment includes a housing 33 having a body 34 and a cover 36 (see FIGS. 3–6), which are secured together by heat sealing or any other appropriate method. The vent plug body 34 is typically a cylindrical structure, which includes coupling structure 38 for engaging corresponding threads or flanges or receiving 40 on the inner surface of the process hole 22 to facilitate frictional engagement of the venting plug 28 in the process hole 32. In the preferred embodiment of the invention, the coupling structure includes threads 38 in the form of a pair of radially extending flanges, which engage corresponding flanges or recesses 40 in the container cover 26. The threads 38 are strengthened by ribs 39 disposed between the bottom surface of the threads 38 and the outer cylindrical lower body portion 39 of the body 34. It should be appreciated, however, consistent with the teachings of the present invention, that a non-threaded plug could be utilized with equal success. In such an embodiment, the coupling structure may be in the form of an enlarged structure or protrusion along the vent plug housing body 34, which is received in a mating depression in the process hole 32, or vice-versa, and provides retentive frictional engagement between the venting plug 28 and the process hole 32.

Figure 13:
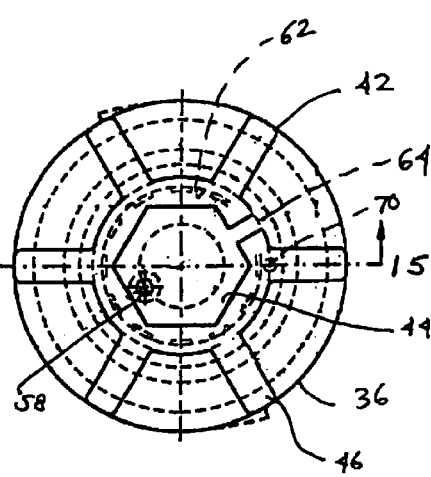
FIG. 13 is a plan view of the vent plug housing cover as viewed from line 13—13 in FIG. 12.

Insertion of the venting plug 28 by rotation into the process hole 22 preferably is facilitated by driving slots, or an engageable formation along the upper end of housing cover 36 of the venting plug 28. In the illustrated embodiment of the invention, the cover 36 of the venting plug 28 includes a protruding rib structure 42 which forms a hexagonally shaped well 44 with six elongated ribs 46 extending radially from its corners, as may best be seen in FIG. 13. During assembly and disassembly from the process holes 32, the venting plug 28 may be easily manipulated and finger tightened by engaging the elongated ribs 46, while an appropriate tool may be used to engage the hexagonally shaped well 44 to further tighten or initially loosen the venting plug 28 from the process hole 32. It will be appreciated, however, that alternately configured driving slots may be utilized.

In order to allow the venting of gases while eliminating or minimizing the risk of spark or flame, the venting plug also typically includes central cavity 48, which has a valve 50 and a flame arrestor 52. The body may also include a lower cavity portion 49, as shown. The illustrated design includes a one-way umbrella check valve 50 which is disposed through a bore 54 in the vent plug housing 34; the flame arrestor 52 is disk-shaped and is disposed along a flange 56 in the vent plug body 34, the valve 50 being disposed subjacent the flame arrestor 52. Gases from the central cavity 48 may be pass through to the environment through a bore 58 in the cover 26, as may be seen in FIGS. 12–14 and 16. In this way, gases may pass from the interior of the battery 20 through bore 58, but flames will be prevented from passing by the flame arrestor 52. It will be appreciated, however, that the invention applies equally, however, to venting plugs that include alternate arrangements for these functions.

Figure 15:
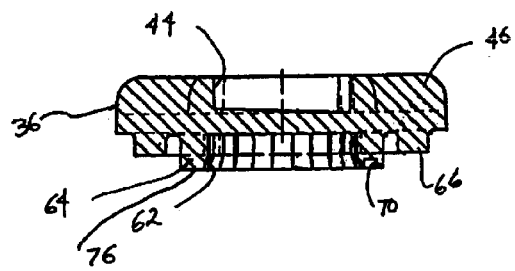
FIG. 15 is a cross-sectional elevational view of the vent plug housing cover taken along line 15—15 in FIG. 13.
Figure 14:
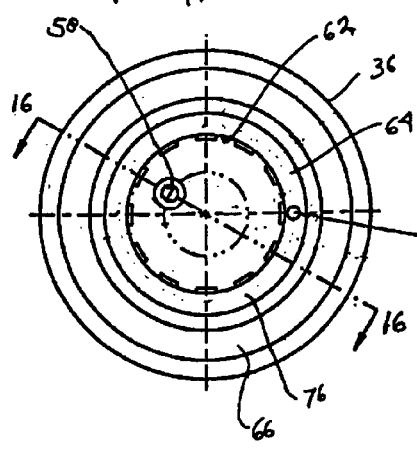
FIG. 14 is a bottom view of the vent plug housing cover as viewed from line 14—14 in FIG. 12.
Figure 16:
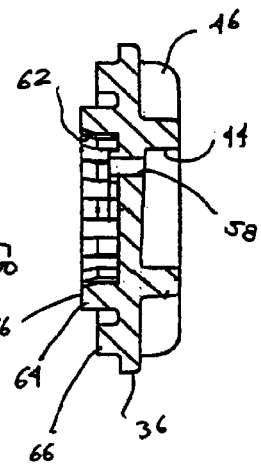
FIG. 16 is a cross-sectional elevational view of the vent plug housing taken along line 16—16 in FIG. 13.

In fabricating the vent plug 28, the body 34 and the cover 36 are separately molded. The valve 50 and flame arrestor 52 are then positioned within the body 34, and the cover 36 positioned on the top of the body 34. As may best be seen in FIG. 6, the body 34 includes an upwardly extending annulus or flange 60 which is received by a central opening 62 formed by annulus or flange 64 in the lower surface of the cover 36 such that the flanges 60 and 64 are adjacently and concentrically disposed. As shown in FIGS. 14–16, the cover 36 also includes flange 66 which extends from the lower surface of the cover 36 and is concentrically disposed about flange 64.

In order to assist in properly locating the cover 36 relative to the body 34, the cover 36 and body 34 may include mating key structures 70, 72, respectively. While an alternate arrangement may be used, in the currently preferred embodiment illustrated, the body 34 includes a protrusion 72 that protrudes from the body 34 along a surface 74 which abuts a surface of the cover 36 (see FIGS. 7, 8 and 10). The cover 36 includes a corresponding depression 70 in a surface 76 of the cover 36 which abuts the body 34, in this case, the lower surface 74 of the annulus 64.

In this way, when the protrusion 72 of the body 34 is disposed in the depression 70 of the cover 36, the relative positions of the body 34 and cover 36 are stabilized. The body 34 and cover 36 are then secured together, preferably by heat sealing or the like, along the surfaces 74, 76. As shown in FIGS. 7, 8 and 10, in order to enhance the heat sealing, the body 34 may additionally include a small raised ring 78 or the like, which likewise protrudes from surface 74. To schematically illustrate the heat sealing between the components 34, 36, a slight interference is shown at 79 in FIG. 6. It will be appreciated, however, that this interference 79 signifies a melting/fusing between the body 34 and cover 36 at this position.

To ensure that no leakage occurs between the venting plug 28 and the process hole 32, a gasket or seal 80 is provided. The seal 80 extends about a sealing surface of the venting plug 28, in this case, the body 34, such that the seal 80 is disposed and squeezed between the body 34 and the process hole 32. The seal 80 may be of any suitable design and material provides the seal 80 inhibits the passage of electrolyte and gases from the interior of the battery 20. In the disclosed design, two sealing surfaces 82, 84 are provided. The first sealing surface 84 is a substantially annular surface which extends about the body 34.

The housing body 34 and cover 36 are typically made of polypropylene or other plastic, and are injection-molded in multicavity molds. Inasmuch as the body 34 generally has a relatively complex molding structure, the body 34 cannot typically be molded in a simple two-part mold. More specifically, the body 34 includes one or more internal cavities 48 that open to the top and/or bottom, as well as external coupling structure 38. Thus, most molds include mold components that extend axially to form the internal surfaces of the body 34 and mold components that extend laterally to form the outside structure of the body 34, including the coupling structure 38 and sealing surfaces 82, 84. Although the precision of molds has greatly increased with the advent of CAD/CAM and precision mold cutting techniques, it will be appreciated by those of skill in the art that molded plastic components will almost always exhibit some sort of mold parting line along surfaces where mold components interface. Moreover, this result can be aggravated over time due to excessive use and wear on the mold. It will further be appreciated that leakage or seepage is much more likely to occur due to capillary action between the sealing surfaces 82, 84 of the body 34 and the seal 80 along such parting lines.

In accordance with the invention, at least one and preferably both the sealing surfaces 82, 84 along which the seal 80 sits display no mold parting line, that is, when the housing body 34 is molded, the sealing surfaces 82, 84 are fabricated such that the mold does not part along either or both of these surfaces 82, 84. Further in accordance with the invention, a method is provided for molding a venting plug body 34 wherein the mold does not part where the sealing surfaces 82, 84 are formed.

Figure 17:
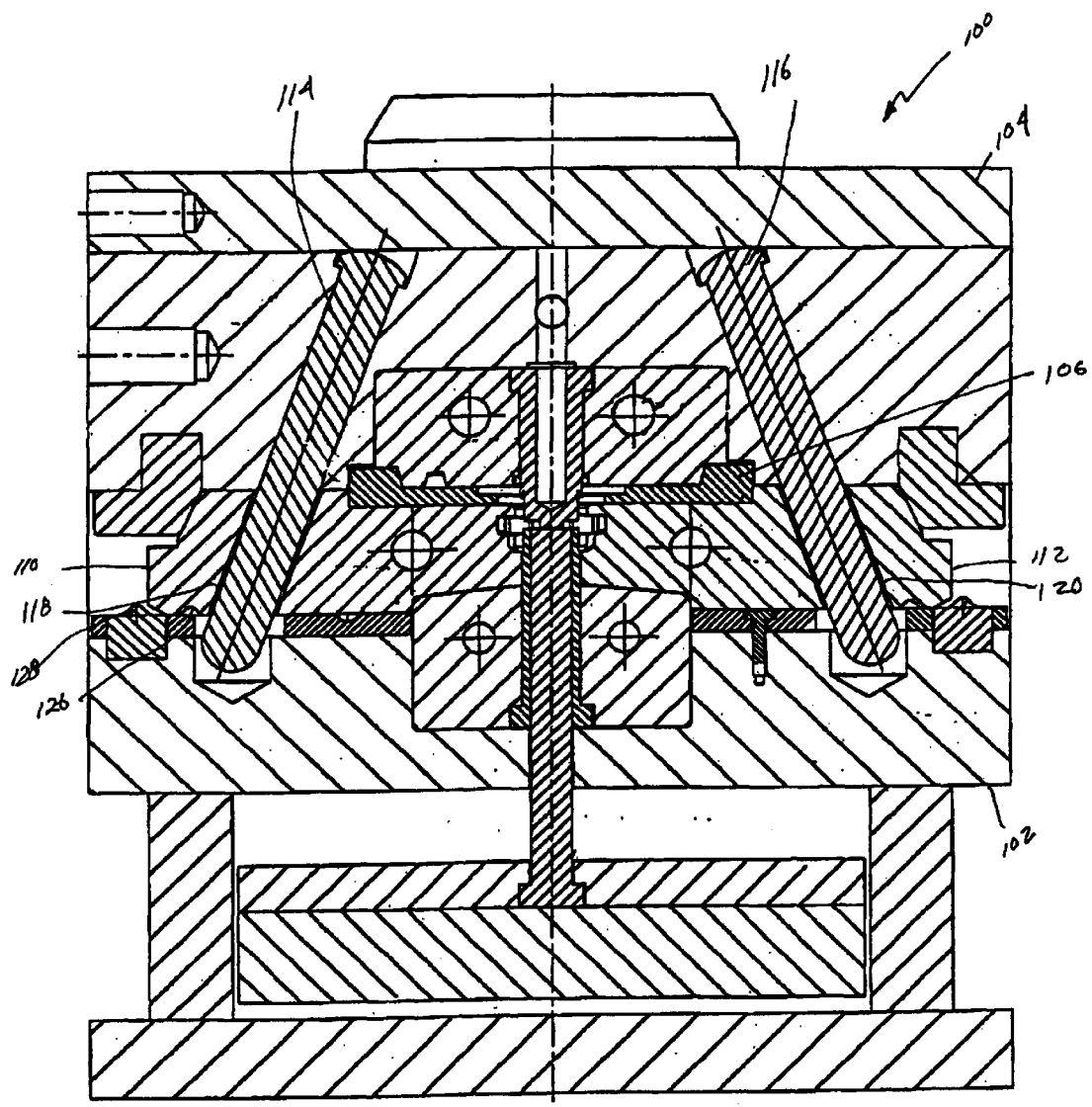
FIG. 17 is a cross-sectional view of a mold for molding a vent plug body constructed in accordance with teachings of the invention and taken along lines 17—17 in FIGS. 18 and 19.
Figure 18:
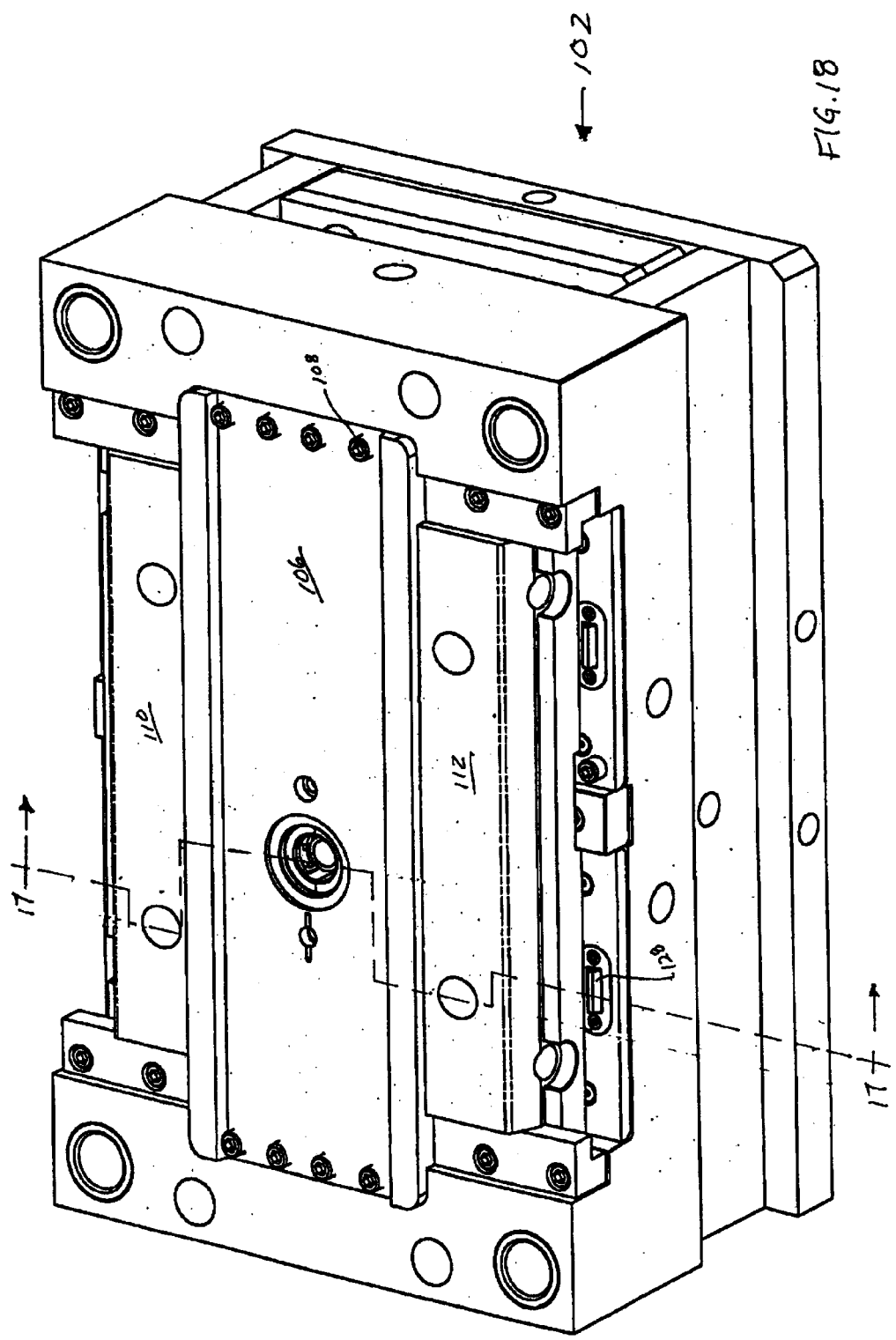
FIG. 18 is a bottom perspective view of the top half of the mold of FIG. 17.
Figure 19:
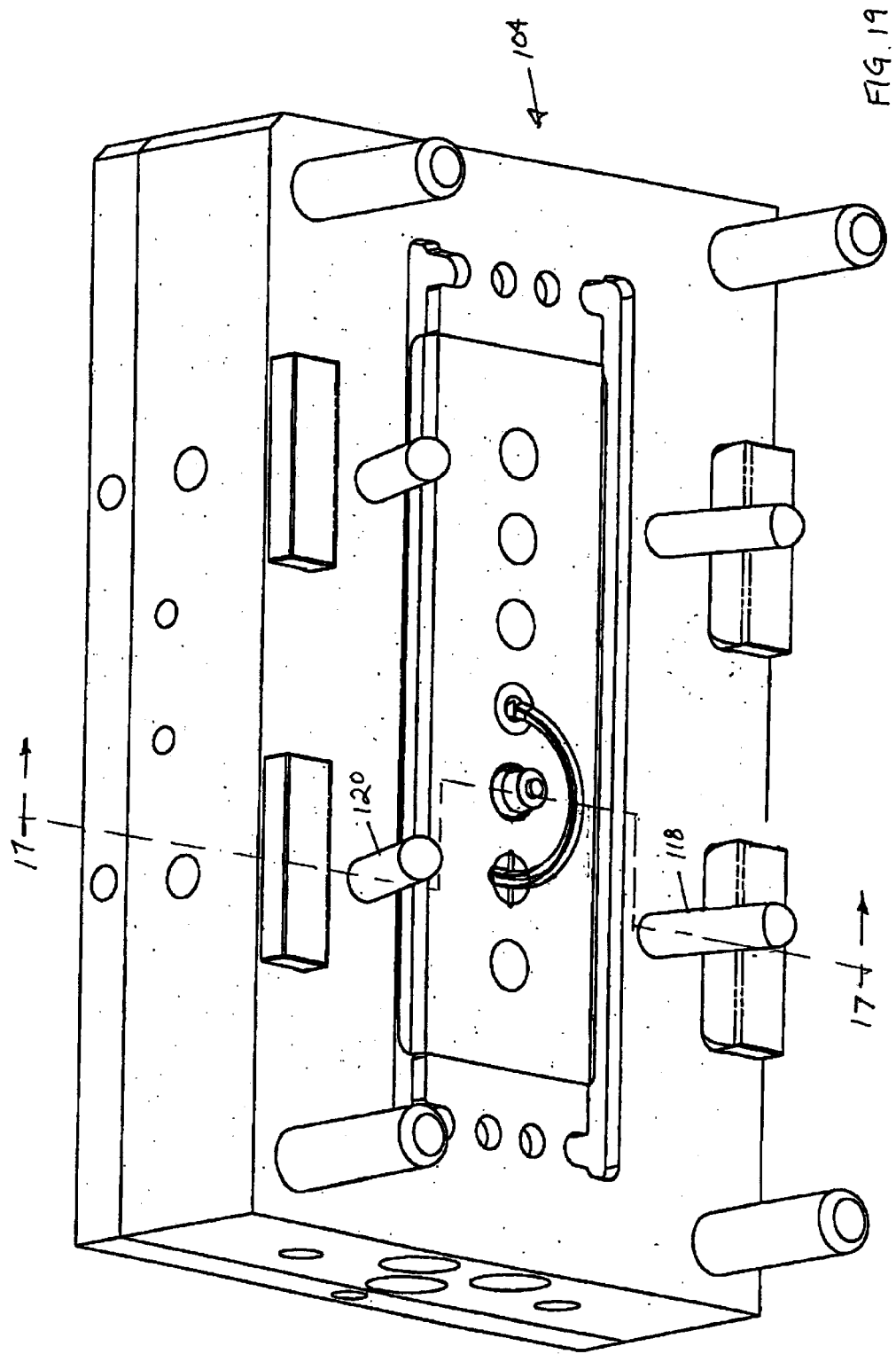
FIG. 19 is a top perspective view of the bottom half of the mold of FIG. 17.

More specifically, there is shown in FIGS. 17–19 a cross-sectional view, the bottom mold half 102, and the top mold half 104 of a mold 100, respectively, for performing the method and for forming the body 34 in accordance with teachings of the invention. According to an important feature of the invention, the sealing surfaces 82, 84 are formed by a single mold plate 106 such that there is no parting line along one or both of the sealing surfaces 82, 84. As may be seen in FIGS. 17 and 19, the mold plate 106 is secured to the lower half 102 of the mold 100 at bolts 108 (see FIG. 19.). Inasmuch as the sealing surfaces 82, 84 are formed by a single component 106, no parting line results along the sealing surfaces 82, 84.

According to another important feature of the invention and in order to form the coupling structure 38, the bottom half 102 of the mold 100 is provided with two components 110, 112, which meet at a substantially vertical parting line to form the lower portion of the body 34. In this way, the sealing surfaces 82, 84 do not display a parting line, while the coupling structure 38 may be molded to display a parting line.

To permit the molded body 34 to be ejected from the mold 100, the components 110, 112 slide outward along the bottom half 102 of the mold 100. Angled pins 114, 116 secured to and extending from the top half 104 of the mold 100 are received in bores 118, 120 in the components 110, 112 such that the components 110, 112 slide apart from one another as the upper half 104 of the mold 100 separates from the lower half 102. In this way, the coupling structure 38 may be molded and display a parting line, while the sealing surfaces 82, 84 may be molded to not display a parting line. It will be appreciated that substantially any coupling structure 38 which comprises protrusions or depressions that could not be readily molded in a single, stationary lower mold half may be molded in this manner, providing considerable latitude in vent plug design, while maintaining a parting-line free sealing surface 82, 84.

FIGS. 20 through 23 illustrate the molding of a body 34 in mold 100. In this embodiment, surface 74 of the upper portion of the body 34, ring 78, and flange 60, as well as central cavity 48 and the bore 54 are formed by surfaces of the upper half 104 of the mold 100. The sealing surfaces 82, 84 are formed by the single component 106 of the lower mold half 102, while the coupling structure 38 is formed by thread-forming components 110, 112. Portions of the lower surface 75 and lower cavity portion 49 of the body 34 are formed by other surfaces of the lower mold half 102, while the remainder of the lower cavity portion 49 is formed by a moveable central pin 122.

Figure 21:
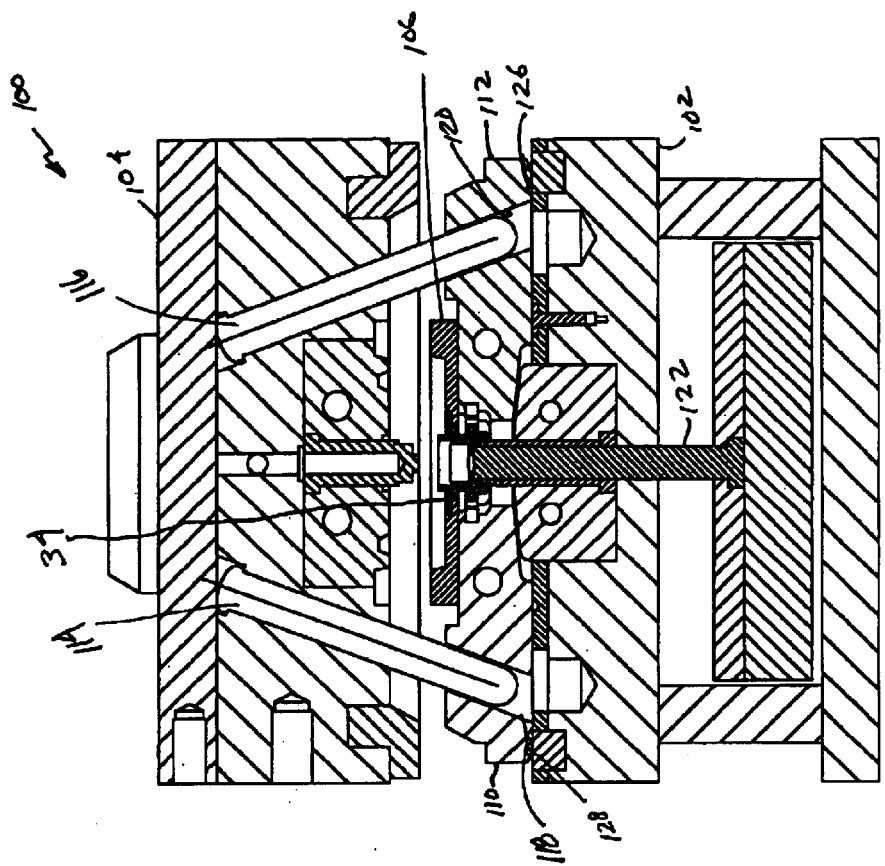
FIGS. 20–23 are successive cross-sectional views of the mold of FIG. 17 during the molding and demolding processes.
Figure 20:
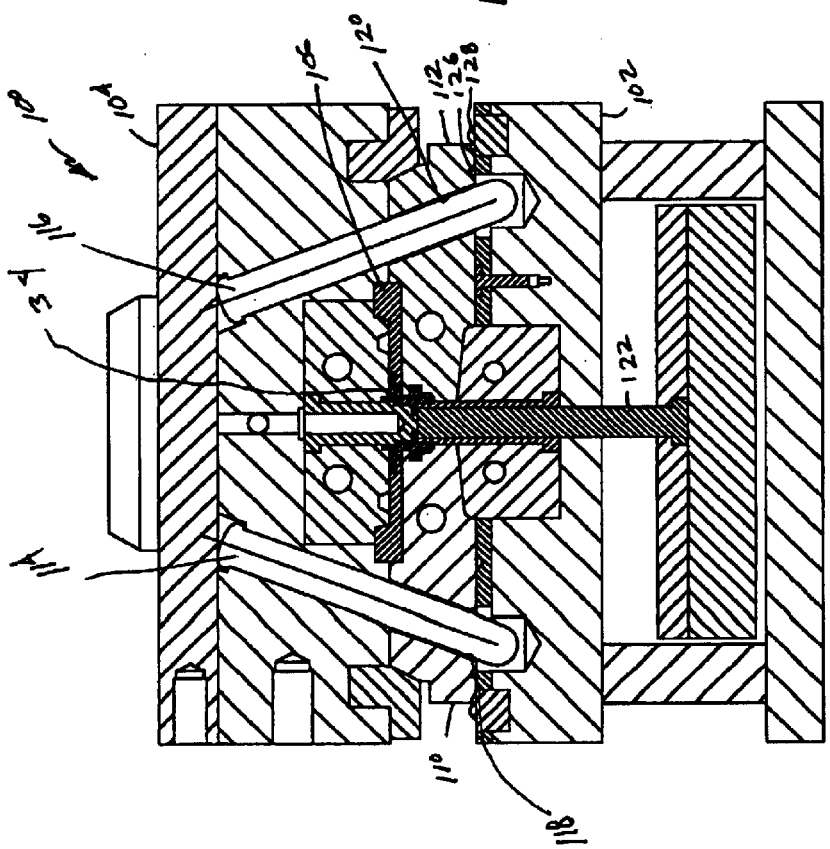
Figure 23:
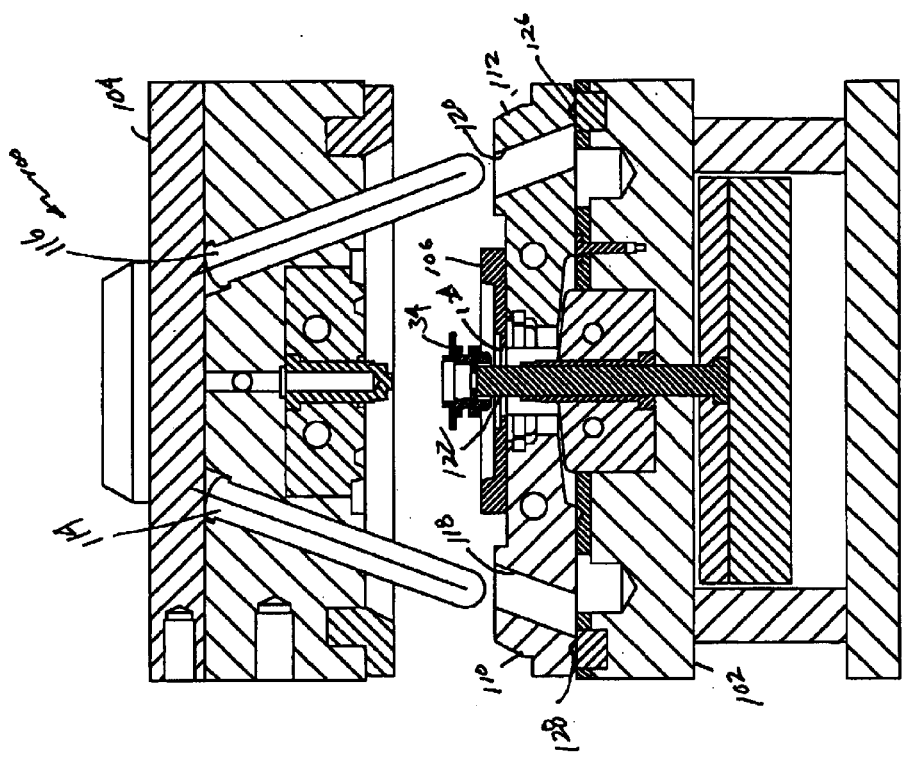
Figure 22:
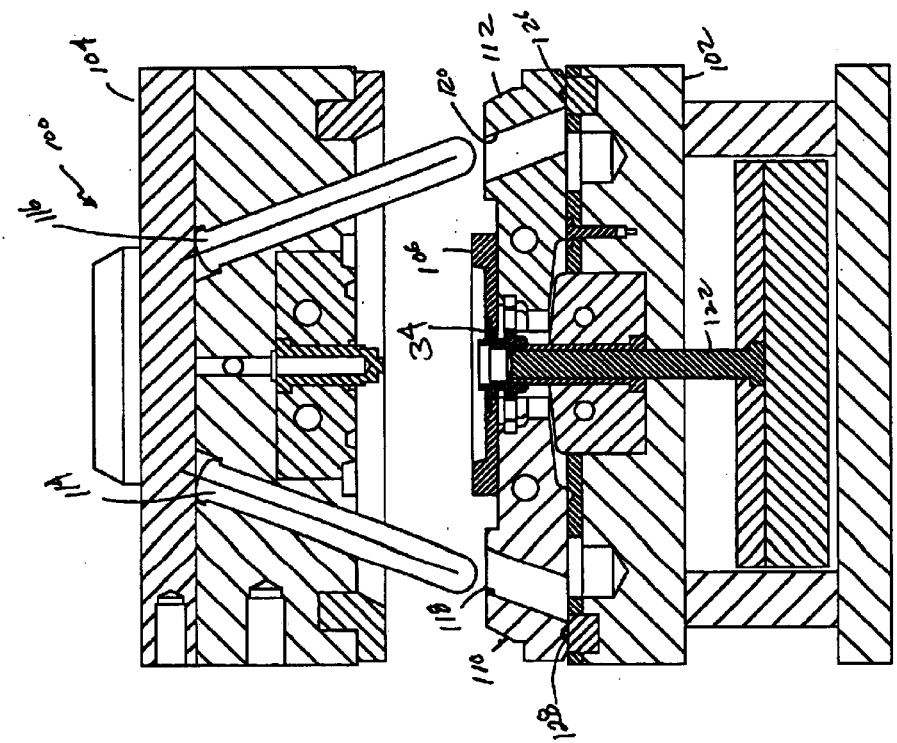

FIG. 20 illustrates the body 34 as it is molded, while FIGS. 21 through 23 illustrate the mold 100 as the halves 102, 104 open and the molded body 34 is ejected. As may be seen in FIGS. 21 and 22, as the upper half 104 raises, the components 110, 112 are urged by the pins 114, 116 to travel outward along an upper surface of the lower mold half 102. It will be noted that that the mold plate 106, which forms the sealing surfaces 82, 84 remains in position. As may be seen in FIG. 22, in the outermost positions of the components 110, 112, depressions 126 along the lower surfaces of the components 110, 112 receive protrusions 128 along an upper surface of the lower mold half 102 to assist in maintaining the components 110, 112 in position. When the components 110, 112 clear the threads 38 (as shown in FIG. 22), the central pin 122 is advanced upward to eject the molded body 34.

It will be noted by those of skill in the art that the outermost surface of the coupling structure 38 is preferably smaller than the opening 124 in mold plate 106. In this way, the coupling structure 38 may be advanced upward through the opening 124 to permit ejection of the body 34 from the lower mold half 102.

In summary, the invention provides a cylindrical valve body 34 for use in a wet, lead-acid battery, a method of molding the same, a mold for molding the same. The valve body 34 has an axis and includes at least one complete sealing surface 82, 84 that does not display a mold parting line. The valve body 34 additionally includes a coupling structure 38 disposed at an angle to the axis and having at least one mold parting line that does not extend in a plane perpendicular to the axis. In this way, a relatively complex body structure 34 may be molded, while maintaining a parting-line free sealing surface.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A venting plug for use with a wet, lead-acid electric storage battery comprising a container and a cover defining at least one cavity, the cover defining at least one cylindrically shaped process hole associated with said cavity, said venting plug being adapted for insertion into said process hole to provide gaseous communication between said cavity and the atmosphere, the venting plug comprising:

a housing having a cylindrical plastic body and a top, said body being molded of plastic and having
an axis,
a coupling portion having an outer surface, said coupling portion comprising at least a portion extending in a plane disposed at an angle to the axis, the outer surface of the coupling portion displaying at least one mold parting line that does not extend in a plane perpendicular to the axis, and
an outer sealing portion, said sealing portion comprising an outer annular sealing surface, said sealing surface displaying no mold parting line.

2. The venting plug as claimed in claim 1 further comprising a seal disposed adjacent said sealing surface and being elastically deformable between the sealing surface and the process hole.

3. The venting plug as claimed in claim 1 wherein the coupling portion comprises at least one flange that extends radially from the body.

4. The venting plug as claimed in claim 3 wherein the coupling portion comprises a center cylindrical portion, and at least two flanges extending radially from the cylindrical portion.

5. The venting plug as claimed in claim 4 wherein the parting line is disposed along an outside surface of the cylindrical portion.

6. The venting plug as claimed in claim 3 wherein the coupling portion comprises a center cylindrical portion, and the at least one flange is a thread which protrudes from the center cylindrical portion.

7. The venting plug as claimed in claim 2 wherein said outer sealing surface comprises a cylindrical portion which extends substantially parallel to the axis, and a planar portion which extends substantially radially from the cylindrical portion.

8. The venting plug as claimed in claim 2 wherein said top is heat sealed to the body.

9. The venting plug as claimed in claim 7 wherein the seal comprises a first surface disposed against the cylindrical portion, and a second surface disposed against the planar portion.

10. The venting plug as claimed in claim 1 wherein the sealing portion comprises a sealing cylindrical portion and an annulus disposed adjacent the sealing cylindrical portion, the sealing cylindrical portion having an inner diameter, the coupling portion comprising a base portion from which two flanges extend, said base portion and flanges defining a perimeter that is no larger than the inner diameter of the sealing cylindrical portion.

11. A wet, lead-acid storage battery comprising a container and a cover defining at least one cavity, the cover defining at least one cylindrically shaped process hole associated with said cavity, and venting plug being adapted for insertion into said process hole to provide gaseous communication between said cavity and the atmosphere, the venting plug comprising:

a housing having a cylindrical plastic body and a top,
said body being molded of plastic and having
an axis,
a coupling portion having an outer surface, said coupling portion comprising at least one coupling flange, at least a portion of the coupling flange extending in a plane disposed at an angle to the axis, the outer surface of the coupling portion displaying at least one mold parting line that does not extend in a plane perpendicular to the axis, and
an outer sealing portion, said sealing portion comprising an outer annular sealing surface, said sealing surface displaying no mold parting lines
a seal disposed adjacent said sealing surface and being elastically deformable between the sealing surface and the process hole.

12. A method of producing a venting plug for use with a wet, lead-acid electric storage battery comprising a container, a cover, the container and cover defining one or more cell cavities, the cover defining cylindrically shaped process holes associated with each cell cavity, said venting being adapted for insertion into said process holes to provide gaseous communication between said cell cavities and the atmosphere, the method comprising the steps of:
providing a mold for molding a substantially cylindrical venting plug body, said mold having an upper half and a lower half, said lower half comprising a solid plate for forming at least one sealing surface of the plug body without a parting line and at least one slideable component for forming at least one coupling flange along a peripheral surface of the venting plug body,
molding a venting plate body having at least one sealing surface and a coupling flange,
opening the mold, and
ejecting the venting plug body from the mold, the venting plug body having a sealing surface that displays no mold parting line.

13. The method as claimed 12 wherein the molding step comprises the step of molding a venting plug body having a substantially cylindrical portion from which the coupling flange extends, the substantially cylindrical portion having an axis and displaying a mold parting line along a surface other than in a plane perpendicular to the axis.

14. The method as claimed in claim 12 wherein the opening the mold step includes the step of molding a venting plug body having a coupling flange in the form of a thread extending about the body.

15. The method as claimed in claim 12 wherein the opening the mold step comprises the steps of sliding the at least one slideable component out of engagement with the molded body, and separating the upper and lower halves of the mold, and said step of molding a first material comprises the step of injection molding a polypropylene material.

16. The method as claimed in claim 15 wherein the opening step comprises the step of maintaining the lower half solid plate in contact with the molded body.

17. The method as claimed in claim 16 wherein the step of ejecting comprises the step of advancing an ejector pin to eject the molded body from the lower half solid plate.

18. A mold for molding the body of a venting plug for use with a wet, lead-acid electric storage battery comprising a container, a cover, the container and cover defining at least one cell cavity, the cover defining a cylindrically shaped process hole associated said cell cavity, said venting plug having a body having at least one sealing surface adapted to receive a seal and to be inserted into said process hole to provide gaseous communication between said cell cavity and the atmosphere, said body having at least one flange for coupling the venting plug to the cover, said mold comprising:
an upper half, and
a lower half, said lower half comprising a solid plate for forming said sealing surface on said venting plug body whereby said solid plate does not result in a mold parting line in said sealing surface, at least one slideable component adapted to form said flange, said slideable component being slideably disposed such that the upper half and the solid plate are separable along a first axis, and said slideable component is moveable to the solid plate along a second axis disposed at an angle to be the first axis whereby a parting line may be formed adjacent to the flange.

19. The mold as claimed in claim 18 comprising two slideable components for forming the coupling flange, said slideable components being moveable relative to the solid plated.

* * * * *